US008236895B2

(12) United States Patent  
Taniguchi et al.

(10) Patent No.: US 8,236,895 B2  
(45) Date of Patent: Aug. 7, 2012

(54) PAINT COMPOSITIONS, A METHOD OF FINISH-PAINTING AND PAINTED OBJECTS

(75) Inventors: Hitoshi Taniguchi, Yokohama (JP); Hiroyuki Takagi, Yokohama (JP); Eishi Tsukamoto, Yokohama (JP); Andreas Poppe, Shanghai (CN); Björn Feldmann, Münster (DE); Julia Melzer, Münster (DE); Sabine Holtschulte, Senden (DE); Karl-Heinz Joost, Drensteinfurt (DE)

(73) Assignees: BASF Coatings Japan Ltd. (JP); BASF Coatings GmbH, Munster (DE)

( * ) Notice: Subject to any disclaimer, the term of this patent is extended or adjusted under 35 U.S.C. 154(b) by 0 days.

(21) Appl. No.: 12/674,534

(22) PCT Filed: Aug. 22, 2008

(86) PCT No.: PCT/EP2008/006913  
§ 371 (c)(1),  
(2), (4) Date: Mar. 8, 2011

(87) PCT Pub. No.: WO2009/024351  
PCT Pub. Date: Feb. 26, 2009

(65) Prior Publication Data  
US 2011/0152440 A1    Jun. 23, 2011

(30) Foreign Application Priority Data  
Aug. 22, 2007    (JP) ................................ 2007-216439

(51) Int. Cl.  
*C08L 75/02* (2006.01)

(52) U.S. Cl. ......... 525/125; 525/123; 525/453; 524/507
(58) Field of Classification Search .................. 525/123, 525/125, 453; 524/507  
See application file for complete search history.

(56) References Cited

U.S. PATENT DOCUMENTS 6,294,607 B1 * 9/2001 Guo et al. ..................... 524/507

FOREIGN PATENT DOCUMENTS

| EP | 1538172 A1 | 6/2005 |
|---|---|---|
| EP | 1240210 B1 | 3/2007 |
| JP | 2002105397 A | 4/2002 |
| JP | 2005126649 A | 5/2005 |
| JP | 2005179662 A | 7/2005 |
| JP | 2006176632 A | 7/2006 |
| JP | WO2007/015130 A1 | 2/2007 |
| WO | WO01/18071 A1 | 3/2001 |
| WO | WO2007/060510 A1 | 5/2007 |

OTHER PUBLICATIONS

International Search Report for International application No. PCT/EP2008/006913 dated Nov. 13, 2008.  
Written Opinion for International application No. PCT/EP2008/006913.

* cited by examiner

*Primary Examiner* — Ling Choi  
(74) *Attorney, Agent, or Firm* — Cantor Colburn LLP

(57) ABSTRACT

Disclosed is a finish paint composition having a hydroxyl group containing resin (A) comprising a hydroxyl group value of 80 to 220 mgKOH/g, a glass transition temperature of −50° or above but below 0° C., and 25 to 55 mass% of units of 4-hydroxybutyl (meth)acrylate origin, a hydroxyl group containing resin (B) with a hydroxyl group value of 80 to 220 mgKOH/g, and a glass transition temperature of 0 to 50° C., and a crosslinking agent (C) comprising polyisocyanate compound having isocyanate groups, wherein the proportions of hydroxyl group containing resin (A) and hydroxyl group containing resin (B) are, as a ratio of solid fraction masses, from 95/5 to 50/50, and the proportion of isocyanate groups of the crosslinking agent (C) with respect to the hydroxyl groups in total of the hydroxyl group containing resin (A) and the hydroxyl group containing resin (B), as the NCO/OH mol ratio, is 0.5 to 1.5.

7 Claims, No Drawings

PAINT COMPOSITIONS, A METHOD OF FINISH-PAINTING AND PAINTED OBJECTS

CROSS REFERENCE TO RELATED APPLICATIONS

This application is a National Phase Application of Patent Application PCT/EP2008/006913 filed on 22 Aug. 2008, which claims priority to JP 2007-216439, filed 22 Aug. 2007, both of which are hereby incorporated by reference in their entirety.

FIELD OF THE INVENTION

The present invention concerns novel paint compositions, a method of finish-painting and painted objects. More precisely, in the automobile painting field in particular, it concerns paint compositions with which paint films which have excellent acid resistance and weather resistance, and in particular excellent car-wash scratching resistance, can be obtained, a method of finish-painting in which these paint compositions are applied and the painted objects which have been obtained with this method of finish-painting.

BACKGROUND OF THE INVENTION

Paint compositions which contain (A) from 5 to 30 wt % of hydroxyl group containing lactone modified oligomer of weight average molecular weight not more than 1000 and of which the hydroxyl group value is from 200 to 800 where a lactone has been used, (B) from 5 to 50 wt % of hydroxyl group containing resin of weight average molecular weight from 1000 to 6000 and of which the hydroxyl group value is from 50 to 200, (C) from 30 to 70 wt % of polyisocyanate compound and (D) from 3 to 30 wt % of melamine resin are known as paint compositions with which the acid rain resistance and scratching resistance are excellent (for example, see Patent Citation 1). However, these paint compositions involve the use of low molecular weight hydroxyl group containing lactone oligomers and so the glass transition point (Tg) of the paint film is inevitably low and there is a disadvantage in that the staining resistance and weather resistance are reduced.

Furthermore, a technique in which (A) vinyl copolymer which has hydroxyl groups and carboxyl groups with a hydroxyl group value of from 20 to 200 mgKOH/g and an acid value of from 5 to 50 mgKOH/g and (B) blocked isocyanate compound where isocyanate compounds comprising (b1) aliphatic polyisocyanate compound which has three or more isocyanate groups in one molecule and (b2) aromatic and/or alicyclic polyisocyanate compound which has three or more isocyanate groups in one molecule in the ratio by mass of solid fractions from 20/80 to 80/20 has been blocked with a blocking agent comprising (b3) heterocyclic compound and (b4) active methylene compound in a mol ratio of from 50/50 to 90/10 are included and the mol ratio of the hydroxyl groups of the (A) component and the blocked isocyanate groups of the (B) component is from 1/2 to 2/1 in which a blocked isocyanate compound is used is known for thermosetting paint compositions which have excellent acid resistance, scratching resistance and durability (for example, see Patent Citation 2). However, with these paint compositions the unblocking reaction of the heterocyclic compound selected from among 3,5-dimethylpyrazole or 1,2,4-triazole is slower than the ester-exchange reaction with the active methylene compound and so there is a weakness in that the hardenability at low temperature is reduced.

Furthermore, coating compositions which include one or more hydroxyl group containing acrylic resin selected from among the hard acrylic resins which have a glass transition temperature (Tg) of from 20° C. to 70° C. and the flexible acrylic resins which have a glass transition temperature (Tg) of from −100° C. to −10° C. where resins which have different glass transition temperatures are combined and one or more di(alkoxy)dicarboxylic acid ester end-capped polyisocyanate crosslinking agent are known as clear-coats which have excellent acid resistance and scratching resistance (for example see Patent Citation 3). However, since di(alkoxy) alkyl dicarboxylic acid ester end-capped polyisocyanate crosslinking agents are used there is a weakness in that the hardening properties and resistance to chemical attack are inadequate.

Furthermore, hardening resin compositions which have acrylic resins which contain hydroxyalkyl groups which have from 4 to 9 carbon atoms and polyfunctional isocyanate compounds as essential components, in which the soft segments make up from 25 to 50 mass % of the total resin solid fraction and which are prepared in such a way that the proportion of soft segment parts originating from lactone-containing monomer with respect to the total solid fraction of the hydroxyl group containing acrylic resin and the polyfunctional isocyanate compound is not more than 8 mass % are known as resin compositions for clear-paint purposes which have excellent scratching resistance and acid resistance (for example, see Patent Citation 4). However, acrylic resins which have a low resin Tg are used and so there is a weakness in that the hardness and resistance to chemical attack of the paint film are reduced.

[Patent Citation 1]
Japanese unexamined patent application laid open 2002-105397
[Patent Citation 2]
Japanese unexamined patent application laid open 2005-126649
[Patent Citation 3]
Japanese unexamined patent application laid open 2005-179662
[Patent Citation 4]
Japanese unexamined patent application laid open 2006-176632

Furthermore, EP 1 240 210 B1 discloses an ultra high coating composition. The composition comprises a polyol blend of a liquid acrylic polyol and a resinous polyol. The polyol blend is crosslinked with a multifunctional isocyanate, melamine, or silane to form a variety of coatings. The coating composition has a significantly higher solid % than that is formulated from a single resin that has similar composition of the combination of the polyol blend. The coatings include less than about 35% by weight of an organic solvent. The liquid acrylic polyol has a hydroxyl number within the range of 20 mg KOH/g to 500 mg KOH/g and a glass transition temperature (Tg) within the range of −70° C. to 0°. The resinous polyol has a hydroxyl number within the range of 20 mg KOH/g to 500 mg KOH/g and a glass transition temperature (Tg) greater than 25° C. The use of 25 to 55 mass % of 4-hydroxybutyl(meth)acrylate in the liquid acrylic polyol is not disclosed.

SUMMARY OF THE INVENTION

The present invention provides paint compositions with which paint films which have excellent car-wash scratching resistance, acid resistance and weather resistance can be formed, a method of finish-painting in which these paint compositions are used, and painted objects which have been obtained with this method of finish-painting.

As a result of thorough research carried out with a view to resolving the abovementioned problems, the inventors have discovered that the above-mentioned objectives can be realized by making a paint composition which includes in specified proportions two types of resin which include hydroxyl groups which have specified hydroxyl group values and different glass transition temperatures and which includes polyisocyanate compound based crosslinking agent which reacts with hydroxyl groups, and the present invention is based upon this discovery.

That is to say, the present invention provides a paint composition which has as essential components hydroxyl group containing resin (A) which has a hydroxyl group value of from 80 to 220 mgKOH/g, a glass transition temperature of −50° C. or above but below 0° C. and which contains from 25 to 55 mass % of units of 4-hydroxybutyl (meth)acrylate origin, hydroxyl group containing resin (B) which has a hydroxyl group value of from 80 to 220 mgKOH/g and a glass transition temperature of from 0 to 50° C., and crosslinking agent (C) comprising polyisocyanate compound which is characterized in that the proportions of hydroxyl group containing resin (A) and hydroxyl group containing resin (B) included are, as a ratio of the solid fraction masses, from 95/5 to 50/50, and the proportion of isocyanate groups which are the functional groups of the crosslinking agent (C) included with respect to the hydroxyl groups in total of the hydroxyl group containing resin (A) and the hydroxyl group containing resin (B), as the NCO/OH mol ratio, is from 0.5 to 1.5.

Furthermore, the present invention includes a paint composition where, in the paint composition described above, the hydroxyl group containing resin (A) and the hydroxyl group containing resin (B) are acrylic resins of which the weight average molecular weights are from 1,000 to 30,000.

Furthermore, the present invention provides a paint composition where, in the paint composition described above, all of the hydroxyl groups of the hydroxyl group containing resin (A) are primary hydroxyl groups.

Furthermore, the present invention provides a paint composition where, in the paint composition described above, the crosslinking agent (C) is an aliphatic poly-isocyanate compound.

Moreover, the present invention provides a method of finish-painting which is characterized in that a paint composition as described above is painted on an object which is to be painted and, moreover, it provides the painted objects which have been painted by means of the abovementioned finish-painting method.

The present invention can provide paint films which have excellent acid resistance and weather resistance and which have in particular excellent car-wash scratching resistance. Furthermore, the method of finish painting in which a paint composition of this invention is used can impart an excellent appearance to the paint film and, moreover, the painted objects obtained by means of the method of finish painting of this invention are excellent in terms of the aforementioned paint film performance.

DETAILED DESCRIPTION OF THE INVENTION

The paint compositions of this invention include two types of hydroxyl group containing resin, hydroxyl group containing resin (A) and hydroxyl group containing resin (B).

The hydroxyl group containing resin (A) is a resin which has a hydroxyl group value of from 80 to 220 mgKOH/g, a glass transition temperature of −50° C. or above but below 0° C. where from 25 to 55 mass % of units originating from 4-hydroxybutyl (meth)acrylate are included in the resin.

In this invention this hydroxyl group containing resin (A) maintains a satisfactory crosslink density in the paint film and, furthermore, it imparts car-wash scratching resistance to the paint film.

The hydroxyl group value of the hydroxyl group containing resin (A) is from 80 to 220 mgKOH/g, preferably from 100 to 200 mgKOH/g, and most desirably from 120 to 200 mgKOH/g. In those cases where the hydroxyl group value is less than 80 mgKOH/g the crosslink density of the paint film is inadequate and so a lowering of the staining resistance and paint film hardness are obtained. Furthermore, in those cases where the hydroxyl group value exceeds 220 mgKOH/g compatibility with the hardening agent is not obtained and so appearance-failure of the paint film arises.

Furthermore, the hydroxyl group containing resin (A) has from 25 to 55 mass %, and more desirably from 30 to 55 mass %, of units originating from 4-hydroxybutyl (meth)acrylate in the resin. If the 4-hydroxybutyl (meth)acrylate included in the hydroxyl group containing resin (A) exceeds 55 mass % then compatibility with the hardening agent is not obtained and so appearance-failure of the paint film arises. Here 4-hydroxybutyl (meth)acrylate signifies that it may be either 4-hydroxybutyl acrylate or 4-hydroxybutyl methacrylate.

The glass transition temperature of the hydroxyl group containing resin (A) is −50° C. or above but below 0° C., and it is preferably from −40° C. to −10° C. In those cases where the glass transition temperature is lower than −50° C. a satisfactory paint film hardness is not obtained and, conversely, in those cases where it is 0° C. or above the paint film becomes brittle and the mechanical strength is reduced. Here the glass transition temperature is the numerical value calculated using the equation indicated below.

$$1/Tg = \Sigma(mi/Tgi)$$

Tg: Glass transition temperature of the copolymer
mi: Mol fraction of the monomer component i
Tgi: Glass transition temperature (K) of a homopolymer of the monomer component i The hydroxyl group containing resin (B) is a resin which has a hydroxyl group value of from 80 to 220 mgKOH/g and a glass transition temperature of from 0 to 50° C.

In this invention the hydroxyl group containing resin (B) can maintain a satisfactory crosslink density in the paint film and can also impart satisfactory paint film hardness.

The hydroxyl group value of the hydroxyl group containing rein (B) is from 80 to 220 mgKOH/g, but it is preferably from 100 to 200 mgKOH/g and most desirably from 120 to 200 mgKOH/g. In those cases where the hydroxyl group value is less than 80 mgKOH/g an adequate paint film hardness is not obtained and the staining resistance is reduced, and in those cases where the hydroxyl group value exceeds 220 mgKOH/g compatibility with the hardening agent is not obtained and so appearance-failure of the paint film occurs.

The glass transition temperature of the hydroxyl group containing resin (B) is from 0 to 50° C., and preferably from 10 to 50° C. In those cases where the glass transition temperature is below 0° C. a satisfactory paint film hardness is not obtained and, conversely, in those cases where it exceeds 50° C. the paint film becomes brittle and the mechanical strength is reduced.

Furthermore, the weight average molecular weights of the hydroxyl group containing resin (A) and the hydroxyl group containing resin (B) are preferably from 1,000 to 30,000, more desirably from 2,000 to 20,000, and most desirably from 3,000 to 15,000. In those cases where the weight average molecular weight is less than 1,000 a satisfactory paint film strength is not obtained and appearance-failure occurs with wet-on-wet painting, and in those cases where the weight average molecular weight exceeds 30,000 appearance-failure of the paint film occurs due to a lowering of the compatibility with the hardening agent.

Furthermore, the hydroxyl group containing resin (A) and the hydroxyl group containing resin (B) are preferably acrylic resins.

Resins which include 50 mass % or more of units originating from acrylic monomer are preferred, resins containing 70 mass % or more are more desirable and resins containing 80 mass % or more are most desirable as the acrylic resins.

Furthermore, all of the hydroxyl groups included in the hydroxyl group containing resin (A) are preferably primary hydroxyl groups.

In those cases where secondary and/or tertiary hydroxyl groups make up the hydroxyl groups which are included in the hydroxyl group containing resin (A) a fall in the acid resistance arises due to hardening failure of the paint film at low temperatures and so this is undesirable.

Units originating from radically polymerizable monomers which have a primary hydroxyl group may be included in the hydroxyl group containing resin (A) as well as the units originating from 4-hydroxybuty (meth)acrylate.

Examples of these radically polymerizable monomers which have a hydroxyl group include 2-hydroxyethyl (meth)acrylate, 3-hydroxypropyl (meth)acrylate, 4-hydroxybutyl (meth)acrylate, allyl alcohol; and ethylene oxide and/or propylene oxide adducts of 2-hydroxyethyl acrylate, 2-hydroxypropyl acrylate, 3-hydroxypropyl acrylate, 4-hydroxybutyl acrylate, 2-hydroxyethyl methacrylate, 2-hydroxypropyl methacrylate, 3-hydroxypropyl acrylate or 4-hydroxybutyl methacrylate.

The hydroxyl group containing resin (B) preferably includes units originating from radically polymerizable monomers which have primary hydroxyl groups.

Units originating from other radically polymerizable monomers may be included in the hydroxyl group containing resin (A) and the hydroxyl group containing resin (B).

Actual examples of these other radically polymerizable monomers include methyl acrylate, ethyl acrylate, n-propyl acrylate, isopropyl acrylate, n-butyl acrylate, isobutyl acrylate, sec-butyl acrylate, hexyl acrylate, cyclohexyl acrylate, 2-ethylhexyl acrylate, octyl acrylate, lauryl acrylate, stearyl acrylate, methyl methacrylate, ethyl methacrylate, n-propyl methacrylate, isopropyl methacrylate, n-butyl methacrylate, isobutyl methacrylate, sec-butyl methacrylate, hexyl methacrylate, cyclohexyl methacrylate, 2-ethylhexyl methacrylate, octyl methacrylate, lauryl methacrylate, stearyl methacrylate, styrene, acrylonitrile, methacrylonitrile, acrylamide, methacrylamide and the like, and one type can be used or they can be used as a mixture of two or more types.

The hydroxyl group containing resin (A) and the hydroxyl group containing resin (B) can be produced by radically polymerizing the abovementioned radically polymerizable monomers.

A radical polymerization initiator may be compounded in those cases where radical polymerization is carried out. Examples of the radical polymerization initiator include azo compounds such as 2,2'-azobisisobutyronitrile, 2,2'-azobis-2,4-dimethyl-valeronitrile, 4,4'-azobis-4-cyanovaleric acid, 1-azobis-1-cyclohexanecarbonitrile, dimethyl-2,2'-azobisisobutyrate and the like, and organic peroxides such as methyl ethyl ketone peroxide, cyclohexanone peroxide, 3,5,5-trimethylhexanone peroxide, 1,1-bis(t-butylperoxy)-3,3,5-trimethylcyclohexane, 1,1-bis(t-butylperoxy)-cyclohexane, 2,2-bis(t-butylperoxy)octane, t-butylhydroperoxide, diisopropyl benzenehydroperoxide, dicumyl peroxide, t-butylcumyl peroxide, isobutyl peroxide, lauroyl peroxide, benzoyl peroxide, diisopropylperoxydicarbonate, t-butylperoxy 2-ethylhexanoate, t-butylperoxy neodecanate, t-butylperoxy laurate, t-butylperoxy benzoate, t-butylperoxy isopropylcarbonate and the like. One of these radical polymerization initiators may be used alone, or a combination of two or more types can be used.

No particular limitation is imposed upon the amount of radical polymerization initiator compounded, but an amount of from 0.01 to 20 mass % with respect to the total amount of radically polymerizable monomer is preferred.

Reducing agents such as dimethylaniline, ferrous salts such as ferrous sulfate, ferrous chloride, ferrous acetate and the like, acidic sodium sulfite, sodium thiosulfate, rongalite and the like may, of course, be included, as required, in these radical polymerization initiator systems, but they must be selected with care so that the polymerization temperature is as low as possible.

Examples of appropriate organic solvents which can be used in the production of the hydroxyl group containing resin (A) and the hydroxyl group containing resin (B) include aliphatic hydrocarbon based solvents such as cyclohexane, ethylcyclo hexane and the like, aromatic hydrocarbon based solvents such as toluene, xylene, ethylbenzene, aromatic naphtha and the like, ketone based solvents such as acetone, methyl ethyl ketone, methyl isobutyl ketone, cyclohexanone, isophorone and the like, ester based solvents such as ethyl acetate, n-butyl acetate, isobutyl acetate, 3-methoxybutyl acetate, bis(2-ethylhexyl)adipate and the like, ether based solvents such as dibutyl ether, tetrahydrofuran, 1,4-dioxane, 1,3,5-trioxane and the like, and nitrogen containing solvents such as acetonitrile, valeronitrile, N,N-dimethyl-formamide, N,N-diethylformamide and the like. The organic solvent may be of one type, or it may be a mixed solvent comprising a plurality of two or more types. At this time the solid fraction concentration of the hydroxyl group containing resin can be selected appropriately within the range where the dispersion stability of the resin is not lost, but generally it is from 10 to 70 mass % as the solid fraction concentration.

The method of adding the organic solvent and the radical polymerization initiator when producing the hydroxyl group containing resin (A) and the hydroxyl group containing resin (B) is optional, but with a view to controlling the heat of polymerization and the heat of reaction the method in which an organic solvent is introduced into the reactor and the radically polymerizable monomer or an organic solution thereof is drip-fed from a drop-feed tank, with stirring is preferred.

The polymerization temperature of the abovementioned polymerization reaction differs according to the type of radical polymerization initiator and whether or not a reducing agent is being used conjointly, but it is preferably carried out under conditions of from 50 to 200° C., and it is most desirably carried out under conditions of from 80 to 160° C. Phase separation of the radically polymerizable monomer and the hydroxyl group containing resin is liable to occur in those cases where the polymerization temperature is below 50° C. On the other hand unexpected side reaction such as depolymerization occur in those cases where it exceeds 200° C.

The proportions in which the hydroxyl group containing resin (A) and the hydroxyl group containing resin (B) are included in a paint composition of this invention are, as the ratio by mass of the resin solid fractions, within the range from 95/5 to 50/50, and preferably with the range from 90/10 to 60/40. If the hydroxyl group containing resin (B) component is less than 5 mass % the resistance to chemical attack of the paint film obtained is reduced, and in those cases where it exceeds 50 mass % the car-wash scratching resistance is reduced.

The isocyanate compounds which have at least two, and preferably three or more, isocyanate groups which react with hydroxyl groups in one molecule can be cited as hardening agents (C) comprising polyisocyanate compounds which can be used in a paint composition of this invention, and one type maybe used alone or a combination of two or more types can be used.

Examples of polyisocyanate compounds which have two or more isocyanate groups per molecule include p-phenylenediisocyanate, biphenyldiisocyanate, tolylenediisocyanate, 3,3'-dimethyl-4,4'-biphenylenediisocyanate, 1,4-tetramethylenediisocyanate, hexamethylenediisocyanate, 2,2,4-trimethylhexane-1,6-diisocyanate, methylenebis(phenylisocyanate), lysine methyl ester diisocyanate, bis(isocyanatoethyl)fumarate, isophoronediisocyanate, methylcyclohexyl-diisocyanate, 2-isocyanatoethyl-2,6-diisocyanatohexanoate and the biuret forms, isocyanurate forms of these compounds and the like.

The proportion of hardening agent (C) isocyanate groups included with respect to the hydroxyl groups of the hydroxyl group containing resin (A) and the hydroxyl group containing resin (B) as the NCO/OH mol ratio is from 0.5 to 1.5, and preferably from 0.8 to 1.2. In those cases where the NCO/OH mol ratio is less than 0.5 a satisfactory crosslink density is not obtained and so the acid resistance and the paint film hardness are reduced. Furthermore, in those cases where the NCO/OH mol ratio exceeds 1.5 a fall in the weather resistance occurs.

The paint compositions of this invention can be used as they are, or they can be used with the addition of organic solvents and various additives, for example one or more of ultraviolet absorber, photo-stabilizer, antioxidant, surfactant, surface controlling agent, hardening reaction catalyst, antistatic agent, perfume, de-watering agent and rheology controlling agents such as polyethylene wax, polyamide wax, fine internally crosslinked type resin particles and the like, as required.

The paint compositions of this invention may be used as clear paints, or coloring agents such as dyes and pigments may be compounded and they can be used as colored paints.

Furthermore, the paint compositions of this invention are preferably used as top-coat paint compositions.

The finish-painting method of a top-coat paint of this invention may be, for example, a two-coat one-bake finish-painting method where a colored base-coat is painted on a base material and in the un-crosslinked state a paint composition of this invention is applied as a top-coat paint, the baked-overcoat finish-painting method where a colored based coat is painted on a base material and, in the un-hardened state, a top coat paint is applied and they are baked at the same time, and then a paint composition of this invention is applied as an over-coat paint and baked, and the finish-painting method in which, in the abovementioned over-coat finish-painting method, a primer paint is applied in order to ensure adhesion of the base-coat and, in the un-crosslinked state, a paint composition of this invention is applied as an over-coat paint.

The abovementioned colored base coat paints, top-coat paints, over-coat paints and primer paints are adjusted to the prescribed viscosity, sometimes by heating or by adding organic solvents and reactive diluents, as required, and then painting is carried out using a painting machine as generally used such as a painting machine of the air sprayer, electrostatic air sprayer, roll coater, flow coater or dipping type, or using a brush or a bar coater, applicator or the like. From among these spray painting is preferred.

No particular limitation is imposed upon the thickness of a paint film obtained by applying a paint composition of this invention, but generally the paint film thickness after drying is preferably from 10 to 150 μm, and most desirably from 10 to 100 μm.

Furthermore, examples of the base materials on which paint compositions of this invention are painted include both organic materials and inorganic materials such as wood, glass, metal, cloth, plastics, foams, elastomers, paper, ceramics, concrete, plaster-board and the like. These base materials may be in an un-surface-treated state, or a paint film may have been formed on the surface beforehand.

Practical examples have been indicated so far, but the method of finish-painting with a paint composition of this invention is not limited by the practical examples.

Examples of coated objects which can be obtained with the method of coating of this invention include structural materials, wooden products, metal products, plastic products, rubber products, paper products, ceramic products, glass products and the like. In more practical terms these include automobiles and automobile parts (for example bodies, bumpers, spoilers, mirrors, wheels, interior decorative parts and the like, which are made of a variety of materials), metal sheets such as steel sheets, bicycles, bicycle parts, materials used on roads (for example guard rails, traffic signs, sound-deadening walls and the like), materials used in tunnels (for example side wall panels and the like), ships, railway rolling stock, aircraft, furniture, musical instruments, domestic electrical goods, building materials, containers, office accessories, sports accessories, toys and the like.

The invention is described in more practical terms below by means of illustrative examples, but the invention is not limited in any way by these illustrative examples.

Moreover, in the examples and comparative examples "parts" signifies "parts by mass" and "%" signifies "mass %".

The performance of the paint films obtained with paint compositions of this invention was determined in the ways indicated below.

1. Appearance

The paint film was observed visually and evaluated on the basis of the following criteria:

◯: When a fluorescent lamp was reflected in the paint film the fluorescent lamp was reflected clearly.

Δ: When a fluorescent lamp was reflected in the paint film the outline (profile) of the fluorescent lamp was slightly blurred.

X: When a fluorescent lamp was reflected in the paint film the outline (profile) of the fluorescent lamp was markedly blurred.

2. Hardness

The paint film was touched with a finger and evaluated on the basis of the following criteria:

◯: The paint film did not feel tacky.

Δ: The paint film felt slightly tacky.

X: The paint film felt very tacky.

3. Car-Wash Scratching Resistance

Muddy water (JIS Z-8901-84, Class 8 dust/water/neutral detergent mixed in a ratio by weight of 10/99/1) was coated with a brush on a test sheet and then subjected to 10 seconds rotation with a car-wash brush at 150 rpm in an automatic car-wash and the test sheet was rinsed with running water. After repeating this process ten times the extent of scratching of the test sheet surface was determined by measuring the L* value with a color difference meter (trade name CR-331, produced by the Minolta Camera Co). A lower numerical value indicates a better result.

4. Acid Resistance

Acid Resistance: A 40% sulfuric acid aqueous solution (0.2 ml) was located as a spot on a test sheet and heated to 60° C. for 15 minutes and then rinsed off with water and the extent of formation of a staining mark was observed visually.

◯: Virtually no change could be seen in the paint film.

Δ: A slight water mark was seen in the paint film.

X: A pronounced water mark was seen in the paint film.

5. Weather Resistance

The state of the paint film was assessed visually after being exposed for 3000 hours using a sunshine carbon arc lamp type accelerated weather resistance testing machine (JIS K-5400 (1990), 9.8.1).

Example of Production 1

Production of the Hydroxyl Group Containing Resin Solution A-1

Xylene (33.9 parts) was introduced into a four-necked flask which had been furnished with a thermometer, a reflux condenser, a stirrer and a dropping funnel and heated to and maintained at 140° C., with stirring, under a current of nitrogen. Next a drip-feed component where radically polymerizable monomers comprising 12 parts of styrene, 24 parts of cyclohexyl methacrylate and 24 parts of 4-hydroxybutyl acrylate and 5 parts of t-butylperoxy-2-ethylhexanoate as polymerization initiator had been mixed together uniformly was drip-fed from the dropping funnel at an even rate over a period of 2 hours. After the drip-feed had been completed the temperature was maintained at 140° C. for 1 hour and then the reaction temperature was lowered to 110° C. Subsequently a polymerization initiator solution where 0.1 part of t-butylperoxy-2-ethylhexanoate as polymerization initiator had been dissolved in 1 part of xylene was added as supplementary catalyst and the reaction was completed by maintaining the temperature at 110° C. for a further period of 2 hours, and the hydroxyl group containing resin solution A-1 was obtained.

Examples of Production 2 to 7

Hydroxyl group containing resin solutions A-2 to A-7 were obtained in the same way as A-1 except that the amounts of the raw materials were changed to those shown in Table 1. The units of the amounts of each component shown in Tables 1 and 2 are parts by mass.

TABLE 1

| | | Ex. of Prod. 1 | Ex. of Prod. 2 | Ex. of Prod. 3 | Ex. of Prod. 4 | Ex. of Prod. 5 | Ex. of Prod. 6 | Ex. of Prod. 7 |
|---|---|---|---|---|---|---|---|---|
| Hydroxy Group Containing Resin Solution | | A-1 | A-2 | A-3 | A-4 | A-5 | A-6 | A-7 |
| Initial Introduction | Xylene | 33.9 | 33.9 | 33.9 | 33.9 | 33.9 | 33.9 | 33.9 |
| Drip-fed Component | n-Butyl Methacrylate | | 24.0 | 12.0 | 5.8 | 6.0 | 7.8 | |
| | n-Butyl acrylate | | | | 18.0 | | | 18.0 |
| | Styrene | 12.0 | 6.0 | 6.0 | 9.0 | 6.0 | 12.0 | 6.0 |
| | 2-Ethylhexyl Methacrylate | | 12.0 | | 18.0 | 12.0 | | |
| | 2-Ethylhexyl Acrylate | | | | | | | 12.0 |
| | Cyclohexyl Methacrylate | 24.0 | | 12.0 | | | 15.0 | |
| | 4-Hydroxybutyl Acrylate | 24.0 | 18.0 | 30.0 | 9.2 | 36.0 | 16.2 | 24.0 |
| | 2-Hydroxyethyl Methacrylate | | | | | | 9.0 | |
| | t-Butylperoxy-2-ethylhexanoate | 5.0 | 5.0 | 5.0 | 5.0 | 5.0 | 5.0 | 5.0 |
| Supplementary Catalyst | t-Butylperoxy-2-ethylhexanoate | 0.1 | 0.1 | 0.1 | 0.1 | 0.1 | 0.1 | 0.1 |
| | Xylene | 1.0 | 1.0 | 1.0 | 1.0 | 1.0 | 1.0 | 1.0 |
| | TOTAL | 100.0 | 100.0 | 100.0 | 100.0 | 100.0 | 100.0 | 100.0 |
| | Resin Hydroxyl Group Value (mgKOH/g) | 156 | 117 | 195 | 60 | 233 | 170 | 156 |
| | Resin Design Glass Transition Temperature (° C.) | −9.1 | −19.5 | −30.9 | −25.4 | −49.7 | 6.8 | −63.5 |
| | Involatile Fraction (mass %) | 65.1 | 65.1 | 65.1 | 65.1 | 65.1 | 65.1 | 65.1 |
| | Proportion of Hydroxybutyl Acrylate Included in the Monomer Composition (mass %) | 40.0 | 30.0 | 50.0 | 15.3 | 60.0 | 27.0 | 40.0 |
| | Weight average molecular weight | 7000 | 7000 | 7000 | 7000 | 7000 | 7000 | 7000 |

Examples of Production 8 to 14

Production of Hydroxyl Group Containing Resin Solutions B-1 to B-7

Hydroxyl group containing resin solutions B-1 to B-7 were obtained in the same way as A-1 except that the amounts of the raw materials were changed to those shown in Table 2.

TABLE 2

| | | Ex. of Prod. 8 | Ex. of Prod. 9 | Ex. of Prod. 10 | Ex. of Prod. 11 | Ex. of Prod. 12 | Ex. of Prod. 13 | Ex. of Prod. 14 |
|---|---|---|---|---|---|---|---|---|
| Hydroxy Group Containing Resin Solution | | B-1 | B-2 | B-3 | B-4 | B-5 | B-6 | B-7 |
| Initial Introduction | Xylene | 33.9 | 33.9 | 33.9 | 33.9 | 33.9 | 33.9 | 33.9 |
| Drip-fed Component | n-Butyl Methacrylate | 6.0 | 6.0 | 9.0 | 21.0 | 4.2 | 6.0 | 12.0 |
| | Styrene | 9.0 | 9.0 | 9.0 | 12.0 | 6.0 | 6.0 | 12.0 |
| | 2-Ethylhexyl Methacrylate | 24.0 | 33.0 | 15.0 | 18.0 | 12.0 | 15.0 | |
| | Cyclohexyl Methacrylate | | | | | 4.8 | | 18.0 |
| | 2-Ethylhexyl Acrylate | | | | | | 15.0 | |
| | 2-Hydroxyethyl Methacrylate | 21.0 | 12.0 | 27.0 | 9.0 | 33.0 | 18.0 | 18.0 |
| | 2-Hydroxyethyl Acrylate | | | | | | | |
| | t-Butylperoxy-2-ethylhexanoate | 5.0 | 5.0 | 5.0 | 5.0 | 5.0 | 5.0 | 5.0 |

TABLE 2-continued

|  |  | Ex. of Prod. 8 | Ex. of Prod. 9 | Ex. of Prod. 10 | Ex. of Prod. 11 | Ex. of Prod. 12 | Ex. of Prod. 13 | Ex. of Prod. 14 |
|---|---|---|---|---|---|---|---|---|
| Supplementary Catalyst | t-Butylperoxy-2-ethylhexanoate | 0.1 | 0.1 | 0.1 | 0.1 | 0.1 | 0.1 | 0.1 |
|  | Xylene | 1.0 | 1.0 | 1.0 | 1.0 | 1.0 | 1.0 | 1.0 |
|  | TOTAL | 100.0 | 100.0 | 100.0 | 100.0 | 100.0 | 100.0 | 100.0 |
|  | Resin Hydroxyl Group Value (mgKOH/g) | 151 | 86 | 194 | 65 | 238 | 130 | 130 |
|  | Resin Design Glass Transition Temperature (° C.) | 27.2 | 17.3 | 36 | 27.4 | 41.4 | −10.0 | 58.3 |
|  | Involatile Fraction (mass %) | 65.1 | 65.1 | 65.1 | 65.1 | 65.1 | 65.1 | 65.1 |
|  | Weight average molecular weight | 6500 | 6500 | 6500 | 6500 | 6500 | 6500 | 6500 |

Examples 1 to 10 and Comparative Examples 1 to 15

The raw materials indicated in Table 3, Table 4 and Table 5 were mixed sequentially and stirred to uniformity to prepare the clear paints CC-1 to CC-25. The units of the amounts compounded for each component shown in Tables 3 to 5 are parts by mass. Furthermore, the units of Tg are 0° C.

TABLE 3

|  |  | Ex. 1 CC-1 | Ex. 2 CC-2 | Ex. 3 CC-3 | Ex. 4 CC-4 | Ex. 5 CC-5 | Ex. 6 CC-6 | Ex. 7 CC-7 | Ex. 8 CC-8 | Ex. 9 CC-9 | Ex. 10 CC-10 |
|---|---|---|---|---|---|---|---|---|---|---|---|
| Hydroxyl group containing resin solution | A-1 | 70.0 | 70.0 | 70.0 | 90.0 | 60.0 | 70.0 | 70.0 |  |  |  |
|  | A-2 |  |  |  |  |  |  |  | 70.0 | 70.0 |  |
|  | A-3 |  |  |  |  |  |  |  |  |  | 70.0 |
|  | A-4 |  |  |  |  |  |  |  |  |  |  |
|  | A-5 |  |  |  |  |  |  |  |  |  |  |
|  | A-6 |  |  |  |  |  |  |  |  |  |  |
|  | A-7 |  |  |  |  |  |  |  |  |  |  |
| Hydroxyl group containing resin solution | B-1 | 30.0 | 30.0 | 30.0 | 10.0 | 40.0 |  |  | 30.0 |  |  |
|  | B-2 |  |  |  |  |  | 30.0 |  |  | 30.0 |  |
|  | B-3 |  |  |  |  |  |  | 30.0 |  |  | 30.0 |
|  | B-4 |  |  |  |  |  |  |  |  |  |  |
|  | B-5 |  |  |  |  |  |  |  |  |  |  |
|  | B-6 |  |  |  |  |  |  |  |  |  |  |
|  | B-7 |  |  |  |  |  |  |  |  |  |  |
| Desmodur N3300 |  | 31.8 | 19.1 | 41.4 | 32.0 | 31.7 | 27.8 | 34.4 | 26.2 | 22.2 | 40.1 |
| Ultraviolet absorber solution |  | 7.0 | 7.0 | 7.0 | 7.0 | 7.0 | 7.0 | 7.0 | 7.0 | 7.0 | 7.0 |
| Photo-stabilizer solution |  | 7.0 | 7.0 | 7.0 | 7.0 | 7.0 | 7.0 | 7.0 | 7.0 | 7.0 | 7.0 |
| Surface controlling agent solution |  | 2.0 | 2.0 | 2.0 | 2.0 | 2.0 | 2.0 | 2.0 | 2.0 | 2.0 | 2.0 |
| Solvesso 100 |  | 15.0 | 15.0 | 15.0 | 15.0 | 15.0 | 15.0 | 15.0 | 15.0 | 15.0 | 15.0 |
| TOTAL |  | 162.8 | 150.1 | 172.4 | 163.0 | 162.7 | 158.8 | 165.4 | 157.2 | 153.2 | 171.1 |
| Hydroxyl group containing resin A |  | A-1 | A-1 | A-1 | A-1 | A-1 | A-1 | A-1 | A-2 | A-2 | A-3 |
| Hydroxyl group containing resin B |  | B-1 | B-1 | B-1 | B-1 | B-1 | B-2 | B-3 | B-1 | B-2 | B-3 |
| Resin solid faction mass ratio hydroxyl group containing resin A/hydroxyl group containing resin B |  | 70/30 | 70/30 | 70/30 | 90/10 | 60/40 | 70/30 | 70/30 | 70/30 | 70/30 | 70/30 |
| Hydroxyl group value of hydroxyl group containing resin A (mgKOH/g) |  | 156 | 156 | 156 | 156 | 156 | 156 | 156 | 117 | 117 | 195 |
| Hydroxyl group value of hydroxyl group containing resin B (mgKOH/g) |  | 151 | 151 | 151 | 151 | 151 | 86 | 194 | 151 | 86 | 194 |
| NCO/OH mol ratio |  | 1.0 | 0.6 | 1.3 | 1.0 | 1.0 | 1.0 | 1.0 | 1.0 | 1.0 | 1.0 |
| Tg of hydroxyl group containing resin A |  | −9.1 | −9.1 | −9.1 | −9.1 | −9.1 | −9.1 | −9.1 | −19.5 | −19.5 | −30.9 |
| Tg of hydroxyl group containing resin B |  | 27.2 | 27.2 | 27.2 | 27.2 | 27.2 | 17.3 | 36.0 | 27.2 | 17.3 | 36.0 |

TABLE 4

|  |  | Comp. Ex. 1 CC-11 | Comp. Ex. 2 CC-12 | Comp. Ex. 3 CC-13 | Comp. Ex. 4 CC-14 | Comp. Ex. 5 CC-15 | Comp. Ex. 6 CC-16 | Comp. Ex. 7 CC-17 | Comp. Ex. 8 CC-18 |
|---|---|---|---|---|---|---|---|---|---|
| Hydroxyl group containing resin solution | A-1 | 100.0 |  | 40.0 | 70.0 | 70.0 | 70.0 | 70.0 | 70.0 |
|  | A-2 |  |  |  |  |  |  |  |  |
|  | A-3 |  |  |  |  |  |  |  |  |
|  | A-4 |  |  |  |  |  |  |  |  |
|  | A-5 |  |  |  |  |  |  |  |  |
|  | A-6 |  |  |  |  |  |  |  |  |
|  | A-7 |  |  |  |  |  |  |  |  |

TABLE 4-continued

|  |  | Comp. Ex. 1 CC-11 | Comp. Ex. 2 CC-12 | Comp. Ex. 3 CC-13 | Comp. Ex. 4 CC-14 | Comp. Ex. 5 CC-15 | Comp. Ex. 6 CC-16 | Comp. Ex. 7 CC-17 | Comp. Ex. 8 CC-18 |
|---|---|---|---|---|---|---|---|---|---|
| Hydroxyl group containing resin solution | B-1 |  | 100.0 | 60.0 | 30.0 | 30.0 |  |  |  |
|  | B-2 |  |  |  |  |  |  |  |  |
|  | B-3 |  |  |  |  |  |  |  |  |
|  | B-4 |  |  |  |  |  | 30.0 |  |  |
|  | B-5 |  |  |  |  |  |  | 30.0 |  |
|  | B-6 |  |  |  |  |  |  |  | 30.0 |
|  | B-7 |  |  |  |  |  |  |  |  |
| Desmodur N3300 |  | 32.1 | 31.1 | 31.5 | 9.6 | 54.1 | 26.5 | 37.2 | 30.5 |
| Ultraviolet absorber solution |  | 7.0 | 7.0 | 7.0 | 7.0 | 7.0 | 7.0 | 7.0 | 7.0 |
| Photo-stabilizer solution |  | 7.0 | 7.0 | 7.0 | 7.0 | 7.0 | 7.0 | 7.0 | 7.0 |
| Surface controlling agent solution |  | 2.0 | 2.0 | 2.0 | 2.0 | 2.0 | 2.0 | 2.0 | 2.0 |
| Solvesso 100 |  | 15.0 | 15.0 | 15.0 | 15.0 | 15.0 | 15.0 | 15.0 | 15.0 |
| TOTAL |  | 163.1 | 162.1 | 162.5 | 140.6 | 185.1 | 157.5 | 168.2 | 161.5 |
| Hydroxyl group containing resin A |  | A-1 | — | A-1 | A-1 | A-1 | A-1 | A-1 | A-1 |
| Hydroxyl group containing resin B |  | — | B-1 | B-1 | B-1 | B-1 | B-4 | B-5 | B-6 |
| Mass ratio hydroxyl group containing resin A/hydroxyl group containing resin B |  | 100/0 | 0/100 | 40/60 | 70/30 | 70/30 | 70/30 | 70/30 | 70/30 |
| Hydroxyl group value of hydroxyl group containing resin A (mgKOH/g) |  | 156 | — | 156 | 156 | 156 | 156 | 156 | 156 |
| Hydroxyl group value of hydroxyl group containing resin B (mgKOH/g) |  | — | 151 | 151 | 151 | 151 | 65 | 238 | 130 |
| NCO/OH mol ratio |  | 1.0 | 1.0 | 1.0 | 0.3 | 1.7 | 1.0 | 1.0 | 1.0 |
| Tg of hydroxyl group containing resin A |  | −9.1 |  | −9.1 | −9.1 | −9.1 | −9.1 | −9.1 | −9.1 |
| Tg of hydroxyl group containing resin B |  |  | 27.2 | 27.2 | 27.2 | 27.2 | 27.4 | 41.4 | −10.0 |

TABLE 5

|  |  | Comp. Ex. 9 CC-19 | Comp. Ex. 10 CC-20 | Comp. Ex. 11 CC-21 | Comp. Ex. 12 CC-22 | Comp. Ex. 13 CC-23 | Comp. Ex. 14 CC-24 | Comp. Ex. 15 CC-25 |
|---|---|---|---|---|---|---|---|---|
| Hydroxyl group containing resin solution | A-1 | 70.0 |  |  |  |  |  |  |
|  | A-2 |  | 70.0 |  |  |  |  |  |
|  | A-3 |  |  | 70.0 |  |  |  |  |
|  | A-4 |  |  |  | 70.0 |  |  |  |
|  | A-5 |  |  |  |  | 70.0 |  |  |
|  | A-6 |  |  |  |  |  | 70.0 |  |
|  | A-7 |  |  |  |  |  |  | 70.0 |
| Hydroxyl group containing resin solution | B-1 |  |  |  | 30.0 |  |  | 30.0 |
|  | B-2 |  |  |  |  | 30.0 |  |  |
|  | B-3 |  |  |  |  |  | 30.0 |  |
|  | B-4 |  |  |  |  |  |  |  |
|  | B-5 |  | 30.0 |  |  |  |  |  |
|  | B-6 |  |  |  |  |  |  |  |
|  | B-7 | 30.0 |  | 30.0 |  |  |  |  |
| Desmodur N3300 |  | 30.5 | 31.6 | 36.2 | 18.0 | 38.9 | 36.5 | 31.8 |
| Ultraviolet absorber solution |  | 7.0 | 7.0 | 7.0 | 7.0 | 7.0 | 7.0 | 7.0 |
| Photo-stabilizer solution |  | 7.0 | 7.0 | 7.0 | 7.0 | 7.0 | 7.0 | 7.0 |
| Surface controlling agent solution |  | 2.0 | 2.0 | 2.0 | 2.0 | 2.0 | 2.0 | 2.0 |
| Solvesso 100 |  | 15.0 | 15.0 | 15.0 | 15.0 | 15.0 | 15.0 | 15.0 |
| TOTAL |  | 161.5 | 162.6 | 167.2 | 149 | 169.9 | 167.5 | 162.8 |
| Hydroxyl group containing resin A |  | A-1 | A-2 | A-3 | A-4 | A-5 | A-6 | A-7 |
| Hydroxyl group containing resin B |  | B-7 | B-5 | B-7 | B-1 | B-2 | B-3 | B-1 |
| Mass ratio hydroxyl group containing resin A/ hydroxyl group containing resin B |  | 70/30 | 70/30 | 70/30 | 70/30 | 70/30 | 70/30 | 70/30 |
| Hydroxyl group value of hydroxyl group containing resin A (mgKOH/g) |  | 156 | 117 | 195 | 60 | 233 | 170 | 156 |
| Hydroxyl group value of hydroxyl group containing resin B (mgKOH/g) |  | 130 | 238 | 130 | 151 | 86 | 194 | 151 |
| NCO/OH mol ratio |  | 1.0 | 1.0 | 1.0 | 1.0 | 1.0 | 1.0 | 1.0 |
| Tg of hydroxyl group containing resin A |  | −9.1 | −19.5 | −30.9 | −25.4 | −49.7 | 6.8 | −63.5 |
| Tg of hydroxyl group containing resin B |  | 58.3 | 41.4 | 58.3 | 27.2 | 17.3 | 36.0 | 27.2 |

<<Table Notes>>
1) Desmodur N3300: Trade name, a liquid HDI cynurate type resin (involatile fraction 100 mass %, NCO content 23 mass %), produced by the Sumika Bayer Urethane Co.
2) Ultraviolet absorber solution: A 20 mass % xylene solution of Tinuvin 900, trade name, produced by the Ciba Specialty Chemical Co.
3) Photo-stabilizer solution: A 20 mass % xylene solution of Tinuvin 292, trade name, produced by the Ciba Specialty Chemical Co.
4) Surface controlling agent solution: A 10 mass % xylene solution of BYK-300, trade name, produced by the Byk-Chemie Co.
5) Solvesso 100: Trade name, aromatic petroleum naphtha, produced by the Esso Co.

Sample Preparation and Investigation of Paint Film Performance

Cationic electro-deposition paint Aqua No. 4200 (trade name, produced by the BASF Coatings Japan Co.) was electro-deposition painted onto a zinc phosphate treated mild steel sheet in such a way as to provide a dry film thickness of 20 μm and baked at 175° C. for 25 minutes and then the mid-coat paint HS-H300 (trade name, produced by the BASF Coatings Japan Co.) was air-spay painted on in such a way as to provide a dry film thickness of 30 μm and baked at 140° C. for 30 minutes. Next Belcoat No. 6000 Black (trade name, produced by the BASF Coatings Japan Co., color: black) which is a solvent-based base-coat paint was air spray painted in such a way as to provide a dry film thickness of 15 μm and, after setting for 3 minutes at 20° C., a clear paint from CC-1 to CC-20 which had been diluted to the painting viscosity (25 seconds at 20° C., Ford Cup No. 4) with Solvesso 100 (trade name, aromatic petroleum naphtha, produced by the Esso Co.) was air spray painted wet-on-wet in such a way as to provide a dry film thickness of 40 μm in each case and baked at 140° C. for 30 minutes to prepare samples.

However, in the case of Examples 1 to 7 the base-coat paint used was switched to Belcoat No. 6000 white (produced by the BASF Coatings Japan Co., color: white) for just the staining resistance test sheets.

The results of the paint film property performance tests are shown in Tables 6, Table 7 and Table 8. The units of Tg shown in Tables 6 to 8 are ° C.

TABLE 6

|  | Example 1 CC-1 | Example 2 CC-2 | Example 3 CC-3 | Example 4 CC-4 | Example 5 CC-5 | Example 6 CC-6 | Example 7 CC-7 | Example 8 CC-8 | Example 9 CC-9 | Example 10 CC-10 |
|---|---|---|---|---|---|---|---|---|---|---|
| Appearance | ○ | ○ | ○ | ○ | ○ | ○ | ○ | ○ | ○ | ○ |
| Hardness | ○ | ○ | ○ | ○ | ○ | ○ | ○ | ○ | ○ | ○ |
| Car wash scratch resistance | 5.8 | 4.5 | 5.8 | 3.8 | 7.9 | 4.6 | 6.8 | 3.9 | 3.5 | 3.0 |
| Acid resistance | ○ | ○ | ○ | ○ | ○ | ○ | ○ | ○ | ○ | ○ |
| Weather resistance | No Abnormality | No Abnormality | No Abnormality | No Abnormality | No Abnormality | No Abnormality | No Abnormality | No Abnormality | No Abnormality | No Abnormality |
| Hydroxyl group containing resin A | A-1 | A-1 | A-1 | A-1 | A-1 | A-1 | A-1 | A-2 | A-2 | A-3 |
| Hydroxyl group containing resin B | B-1 | B-1 | B-1 | B-1 | B-1 | B-2 | B-3 | B-1 | B-2 | B-3 |
| Mass ratio hydroxyl group containing resin A/hydroxyl group containing resin B | 70/30 | 70/30 | 70/30 | 90/10 | 60/40 | 70/30 | 70/30 | 70/30 | 70/30 | 70/30 |
| Hydroxyl group value of hydroxyl group containing resin A (mgKOH/g) | 156 | 156 | 156 | 156 | 156 | 156 | 156 | 117 | 117 | 195 |
| Hydroxyl group value of hydroxyl group containing resin B (mgKOH/g) | 151 | 151 | 151 | 151 | 151 | 86 | 194 | 151 | 86 | 194 |
| NCO/OH mol ratio | 1.0 | 0.6 | 1.3 | 1.0 | 1.0 | 1.0 | 1.0 | 1.0 | 1.0 | 1.0 |
| Tg of hydroxyl group containing resin A | −9.1 | −9.1 | −9.1 | −9.1 | −9.1 | −9.1 | −9.1 | −19.5 | −19.5 | −30.9 |
| Tg of hydroxyl group containing resin B | 27.2 | 27.2 | 27.2 | 27.2 | 27.2 | 17.3 | 36.0 | 27.2 | 17.3 | 36.0 |

TABLE 7

|  | Comp. Ex. 1 CC-11 | Comp. Ex. 2 CC-12 | Comp. Ex. 3 CC-13 | Comp. Ex. 4 CC-14 | Comp. Ex. 5 CC-15 | Comp. Ex. 6 CC-16 | Comp. Ex. 7 CC-17 | Comp. Ex. 8 CC-18 |
|---|---|---|---|---|---|---|---|---|
| Appearance | ○ | ○ | ○ | ○ | Δ | ○ | Δ | ○ |
| Hardness | X | ○ | ○ | ○ | ○ | ○ | ○ | Δ |
| Car wash scratch resistance | 3.5 | 28.4 | 14.1 | 3.7 | 7.2 | 6.5 | 9.6 | 5.0 |
| Acid resistance | X | ○ | ○ | X | ○ | Δ | ○ | Δ |
| Weather resistance | No Abnormality | No Abnormality | No Abnormality | No Abnormality | No Abnormality | No Abnormality | No Abnormality | No Abnormality |
| Hydroxyl group containing resin A | A-1 | — | A-1 | A-1 | A-1 | A-1 | A-1 | A-1 |
| Hydroxyl group containing resin B | — | B-1 | B-1 | B-1 | B-1 | B-4 | B-5 | B-6 |
| Mass ratio hydroxyl group containing resin A/hydroxyl group containing resin B | 100/0 | 0/100 | 40/60 | 70/30 | 70/30 | 70/30 | 70/30 | 70/30 |
| Hydroxyl group value of hydroxyl group containing resin A (mgKOH/g) | 156 | — | 156 | 156 | 156 | 156 | 156 | 156 |
| Hydroxyl group value of hydroxyl group containing resin B (mgKOH/g) | — | 151 | 151 | 151 | 151 | 65 | 238 | 130 |
| NCO/OH mol ratio | 1.0 | 1.0 | 1.0 | 0.3 | 1.7 | 1.0 | 1.0 | 1.0 |
| Tg of hydroxyl group containing resin A | −9.1 | — | −9.1 | −9.1 | −9.1 | −9.1 | −9.1 | −9.1 |
| Tg of hydroxyl group containing resin B | — | 27.2 | 27.2 | 27.2 | 27.2 | 27.4 | 41.4 | −10 |

TABLE 8

|  | Comp. Ex. 9 CC-19 | Comp. Ex. 10 CC-20 | Comp. Ex. 11 CC-21 | Comp. Ex. 12 CC-22 | Comp. Ex. 13 CC-23 | Comp. Ex. 14 CC-24 | Comp. Ex. 15 CC-25 |
|---|---|---|---|---|---|---|---|
| Appearance | ○ | Δ | ○ | ○ | X | ○ | ○ |
| Hardness | ○ | ○ | ○ | Δ | Δ | ○ | X |
| Car wash scratch resistance | 13.8 | 8.9 | 13.1 | 12.6 | 7.3 | 16.9 | 4.7 |
| Acid resistance | ○ | ○ | ○ | ○ | Δ | ○ | Δ |
| Weather resistance | No Abnormality | No Abnormality | No Abnormality | No Abnormality | No Abnormality | No Abnormality | No Abnormality |
| Hydroxyl group containing resin A | A-1 | A-2 | A-3 | A-4 | A-5 | A-6 | A-7 |
| Hydroxyl group containing resin B | B-7 | B-5 | B-7 | B-1 | B-2 | B-3 | B-1 |
| Mass ratio hydroxyl group containing resin A/hydroxyl group containing resin B | 70/30 | 70/30 | 70/30 | 70/30 | 70/30 | 70/30 | 70/30 |
| Hydroxyl group value of hydroxyl group containing resin A (mgKOH/g) | 156 | 117 | 195 | 60 | 233 | 170 | 156 |
| Hydroxyl group value of hydroxyl group containing resin B (mgKOH/g) | 130 | 238 | 130 | 151 | 86 | 194 | 151 |
| NCO/OH mol ratio | 1.0 | 1.0 | 1.0 | 1.0 | 1.0 | 1.0 | 1.0 |
| Tg of hydroxyl group containing resin A | −9.1 | −19.5 | −30.9 | −25.4 | −49.7 | 6.8 | −63.5 |
| Tg of hydroxyl group containing resin B | 58.3 | 41.4 | 58.3 | 27.2 | 17.3 | 36 | 27.2 |

The invention claimed is:

1. A paint composition comprising
a hydroxyl group containing resin (A) comprising a hydroxyl group value of from 80 to 220 mg KOH/g, a glass transition temperature of −50° C. or above but below 0° C., and from 25 to 55 mass % of units of 4-hydroxybutyl (meth)acrylate origin,
a hydroxyl group containing resin (B) comprising a hydroxyl group value of from 80 to 220 mg KOH/g, and a glass transition temperature of from 0 to 50° C., and
a crosslinking agent (C) comprising a polyisocyanate compound having isocyanate groups,
wherein the proportions of hydroxyl group containing resin (A) and hydroxyl group containing resin (B) are, as a ratio of solid fraction masses, from 95/5 to 50/50, and the proportion of isocyanate groups of the crosslinking agent (C) with respect to the hydroxyl groups in total of the hydroxyl group containing resin (A) and the hydroxyl group containing resin (B), as the NCO/OH mol ratio, is from 0.5 to 1.5.

2. The paint composition of claim 1 wherein the hydroxyl group containing resin (A) and the hydroxyl group containing resin (B) comprise acrylic resins having weight average molecular weights of from 1,000 to 30,000.

3. The paint composition of claim 1 wherein all of the hydroxyl groups of the hydroxyl group containing resin (A) are primary hydroxyl groups.

4. The paint composition of claim 1 wherein the crosslinking agent (C) comprises an aliphatic polyisocyanate compound.

5. A paint composition consisting essentially of
a hydroxyl group containing resin (A) comprising a hydroxyl group value of from 80 to 220 mg KOH/g, a glass transition temperature of −50° C. or above but below 0° C., and from 25 to 55 mass % of units of 4-hydroxybutyl (meth)acrylate origin,
a hydroxyl group containing resin (B) comprising a hydroxyl group value of from 80 to 220 mg KOH/g, and a glass transition temperature of from 0 to 50° C., and
a crosslinking agent (C) comprising a polyisocyanate compound having isocyanate groups,
wherein the proportions of hydroxyl group containing resin (A) and hydroxyl group containing resin (B) are, as a ratio of solid fraction masses, from 95/5 to 50/50, and the proportion of isocyanate groups of the crosslinking agent (C) with respect to the hydroxyl groups in total of the hydroxyl group containing resin (A) and the hydroxyl group containing resin (B), as the NCO/OH mol ratio, is from 0.5 to 1.5.

6. A method of finish-painting, comprising painting an object with the paint composition of claim 1.

7. A painted object, made by the method of finish-painting of claim 6.

* * * * *